Nov. 23, 1926.

C. B. PARSONS 1,607,746

RADIATOR SHIELD OPERATING MECHANISM

Filed April 20, 1925    2 Sheets-Sheet 1

INVENTOR.
CARL B. PARSONS
BY
Parker & Burton
ATTORNEYS.

Nov. 23, 1926.   1,607,746
C. B. PARSONS
RADIATOR SHIELD OPERATING MECHANISM
Filed April 20, 1925   2 Sheets-Sheet 2

INVENTOR.
CARL B. Parsons
BY
Parker & Burton
ATTORNEYS.

Patented Nov. 23, 1926.

1,607,746

UNITED STATES PATENT OFFICE.

CARL B. PARSONS, OF DETROIT, MICHIGAN, ASSIGNOR TO MOTOR PRODUCTS CORPORATION, OF DETROIT, MICHIGAN, A CORPORATION OF NEW YORK.

RADIATOR-SHIELD-OPERATING MECHANISM.

Application filed April 20, 1925. Serial No. 34,442.

My invention relates to an improved protective front for an automobile radiator.

An object is to provide an inexpensive, durable, and attractive cover or protective front for the radiator of an automobile adapted to protect the same during the winter months and capable of being actuated to permit the entrance of air to the radiator while permitting the direct blast of the air thereon.

My construction is an improvement upon the invention set forth in U. S. application, Serial No. 673,337, filed November 7, 1923, and relates particularly to improved operating mechanism to swing the protective shield to an open position and to retain the same at the position to which it has been moved and to an improved mounting for the swingable portion of the shield.

Further objects and advantages of my invention will more fully appear from the following specification accompanying drawings and appended claims.

Figure 1:
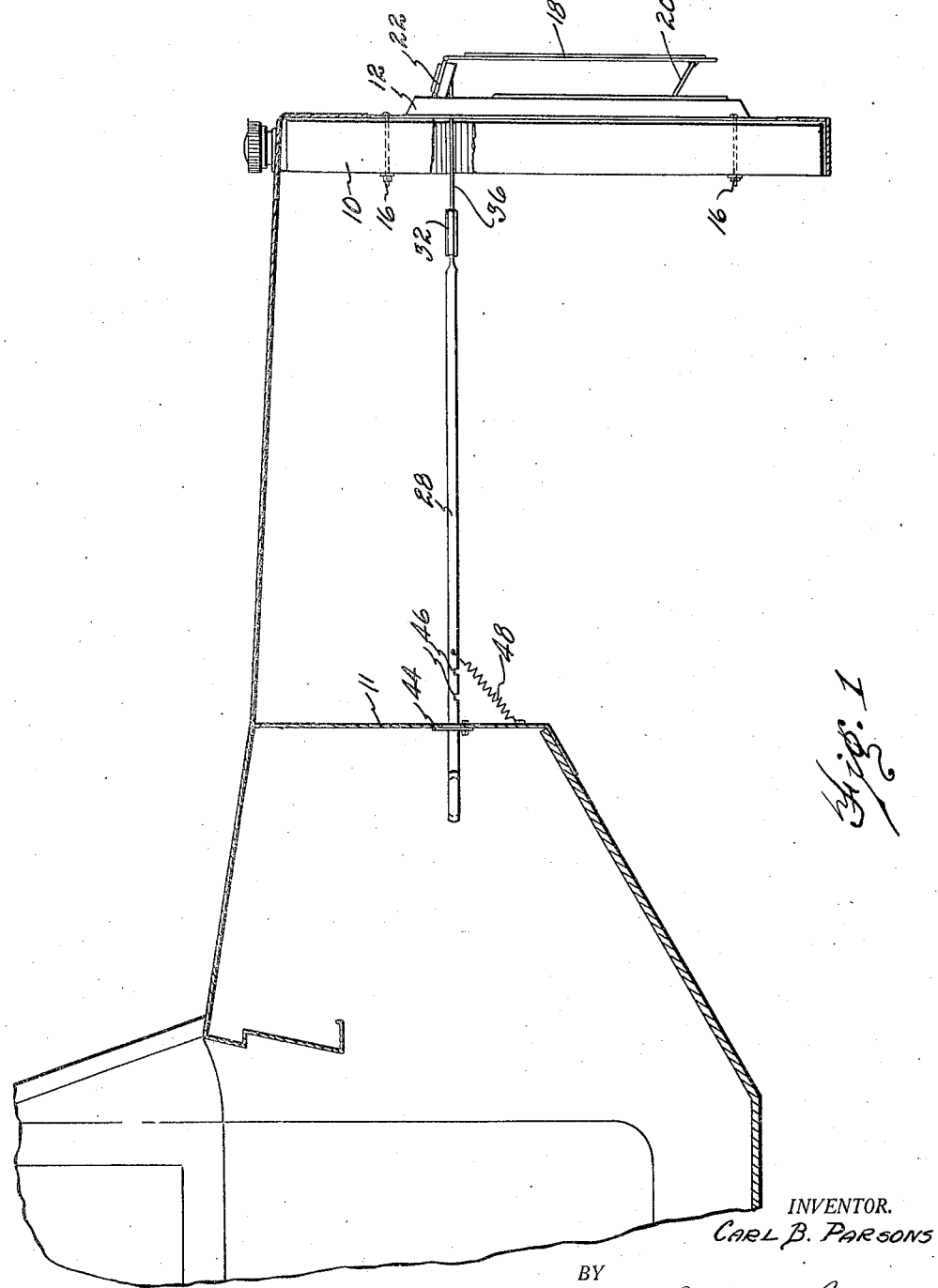
Figure 1 is a broken away elevation, partly in section, of an automobile body showing the radiator and dash and contiguous portions of the vehicle.

My invention is adapted for application to any type of motor vehicle and in the drawings the radiator is indicated as 10 and the dash as 11.

Figures 3, 4:
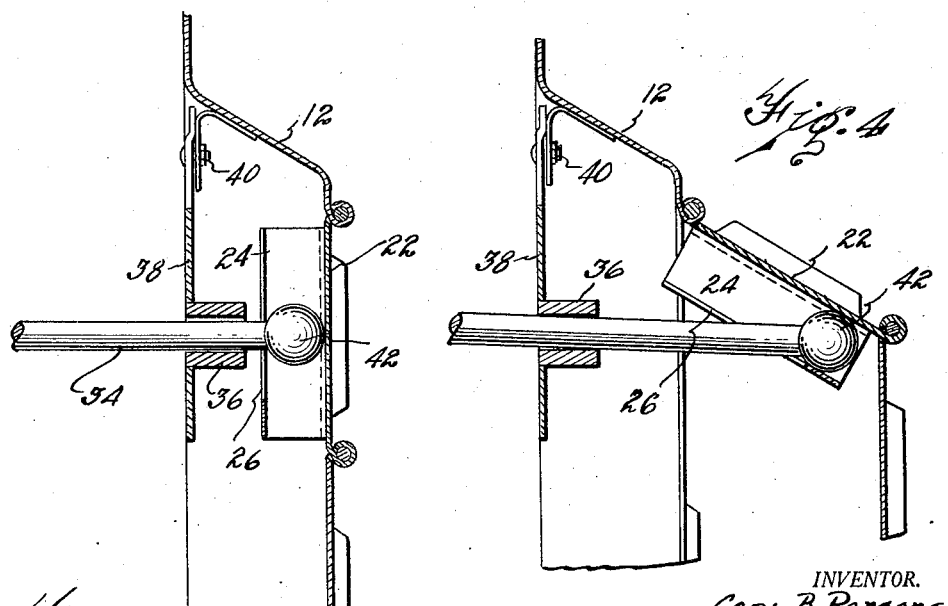
Fig. 3 is a sectional view taken on line 3—3 of Fig. 2 showing the cover in the closed position.
Fig. 4 is a sectional view taken on the same line as Fig. 3 showing the cover in the open position.

My cover or protective front is secured over the radiator core, as shown in Fig. 1. It comprises a frame 12, which is provided with suitable apertures 14, through which bolts 16 extend to secure the cover to the radiator. This frame member is provided with a face plate 18, hinged by means of links 20 at the bottom to the frame, and hinged by means of a swinging plate 22 to the top of the frame, so that when it lies flat against the frame it closes the opening therethrough and covers the radiator. The face plate is adapted to be moved forwardly to a position of substantial parallelism with the frame, as shown in Figures 1 and 4. The face plate is provided with a series of vertical openings which register with a series of vertical strips of the frame so that when the face plate is moved to the open position there is no direct entrance for air to the radiator but its flow through the cover to the radiator is indirect. This construction, except for the swinging links 20, is shown in the application hereinabove referred to.

I provide a tubular guide or channel member 24 which is secured to the underside of the swinging plate 22 and extends at substantially right angles to the hinged connection between such swinging plate and the frame 12. This guide is of tubular construction and provided with a slot 26 extending for a portion of its length.

Figure 2:
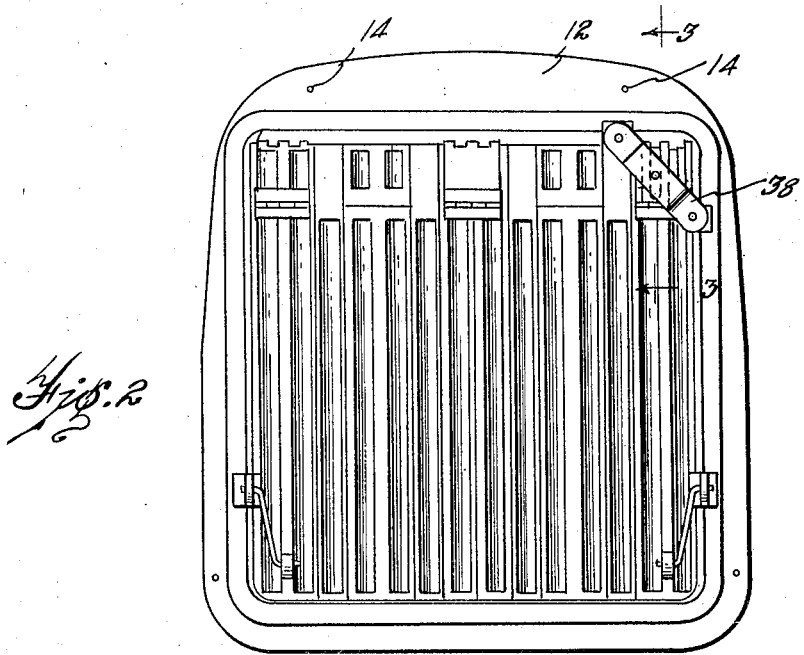
Fig. 2 is a front elevation of my improved cover.

I provide a push rod 28, which extends through the dash 11, to be disposed for operation by the driver of the vehicle, and is jointed at 32, and has a forwardly extending distortable section 34, which extends through the radiator and through a fixed bearing 36 carried by the frame 12 of my cover. This bearing is supported by a brace 38, secured at each end by bolts 40, as shown in Figs. 2, 3, and 4, in one corner of the frame 12. The portion 34 of the push rod is provided at its forward end with a ball 42, which is disposed within the guide member 24, the push rod extending through the channel 26 of the guide.

When it is desired to open the cover, the push rod is moved forwardly by the operator and bears against the hinged section 22 and swings the face plate of the cover forwardly and upwardly to the open position shown in Figures 1 and 4. The ball 42 of the push rod travels through the guide member in this swinging movement of the cover and the end section 34 of the push rod is slightly distorted and wedged between the guide member 24 and the bearing 36, as shown in Figure 4, so that the face plate is held in an open position under a certain amount of tension which serves to retain it in such open position against accidental displacement and prevents rattle. In order that the face plate may be positively locked at any position to which it is moved, I provide at the dash a lock plate 44, having an aperture through which the push rod extends and the push rod is provided on its lower edge with a series of spaced apart recesses 46, adapted to engage the edge of the plate 44.

A spring 48 is provided to hold the push rod against the edge of the plate 44 to retain the push rod at its position of adjustment.

What I claim is:

1. In an automobile having a radiator, a cover hinged to the radiator to be swung forwardly thereof to uncover the same, said cover provided with a channel guide, a push rod having a bearing in said channel and extending rearwardly thereof to be operated by the driver of the vehicle to open the cover, said push rod adapted to travel through said channel as the cover is swung forwardly, a bearing through which said push rod extends disposed in proximity to the cover; said push rod between said cover and bearing distortable as the push rod is moved forwardly to open the cover, so as to be wedged between the bearing and the guide of the cover to retain the cover in the open position.

2. In an automobile having a radiator, a cover for the radiator, comprising a frame secured to the radiator and a face plate hinged to the frame at the bottom by a pair of swinging links and at the top by a hinged plate so as to be swung forwardly and upwardly into substantial parallelism with the frame to uncover the radiator, said hinged plate provided with a channel guide, a push rod having one end mounted in said channel guide and extending rearwardly thereof for operation by the driver of the vehicle, said push rod adapted to be actuated to swing said face plate forwardly and adapted to travel through the channel guide during the swinging movement of said face plate.

3. In an automobile radiator provided with a cover hinged thereto to be swung forwardly thereof to uncover the same, operating mechanism to actuate the cover comprising a guide channel carried by the cover, a bearing in line with said guide channel, a push rod extending through said bearing having an end portion disposed within said guide channel to travel therethrough upon endwise movement of the push rod to swing the cover forwardly away from the radiator.

4. In an automobile radiator having a cover hinged thereto to be swung forwardly thereof, operating mechanism to actuate the cover comprising a guide channel carried by the cover, a fixed bearing in line with said guide channel, a push rod extending through said bearing having an end portion disposed within said guide channel to travel therethrough upon endwise movement of the push rod to swing the cover forwardly away from the radiator, said push rod being flexible to permit distortion thereof between the bearing and the guide channel mounted on the cover.

5. In an automobile radiator provided with a cover hinged thereto to be swung forwardly thereof, operating mechanism comprising a guide channel formed on the cover, a fixed bearing in line with said guide channel, a push rod extending through said bearing having an enlarged end portion disposed within said guide channel to travel therethrough upon endwise movement of the push rod to swing the cover forwardly away from the radiator.

6. An automobile radiator cover comprising a frame secured to the radiator and a face plate hinged to the frame at the top by a swinging section and hinged to the frame at the bottom to permit the plate to be swung forwardly away from the frame, a guide channel mounted upon said swinging section, a bearing carried by the frame disposed in line with said guide channel when the face plate is in the closed position, and a push rod extending through said bearing provided with an enlarged end portion mounted within said guide channel to travel therethrough as the push rod is moved endwise, said push rod being flexible to permit distortion thereof between said bearing and said guide channel.

In testimony whereof, I sign this specification.

CARL B. PARSONS.